United States Patent
Sherman et al.

(10) Patent No.: US 9,247,482 B2
(45) Date of Patent: Jan. 26, 2016

(54) AD HOC WIRELESS COMMUNICATIONS NETWORK WITH NODE ROLE INFORMATION ROUTING AND ASSOCIATED METHODS

(75) Inventors: Stephen Guy Sherman, Fairport, NY (US); Justin Roy Dietrich, Caledonia, NY (US); Timothy Raymond Klembczyk, Penfield, NY (US); Nick Andrew Van Stralen, Bloomfield, NY (US); Tony Michael Dal Santo, Rochester, NY (US); James Andrew McCusker, W. Henrietta, NY (US)

(73) Assignee: HARRIS CORPORATION, Melbourne, FL (US)

( * ) Notice: Subject to any disclaimer, the term of this patent is extended or adjusted under 35 U.S.C. 154(b) by 422 days.

(21) Appl. No.: 13/197,350

(22) Filed: Aug. 3, 2011

(65) Prior Publication Data
US 2013/0034031 A1 Feb. 7, 2013

(51) Int. Cl.
*H04W 40/26* (2009.01)
*H04W 84/18* (2009.01)
*H04L 12/715* (2013.01)

(52) U.S. Cl.
CPC ............... *H04W 40/26* (2013.01); *H04L 45/04* (2013.01); *H04W 84/18* (2013.01)

(58) Field of Classification Search
CPC ...... H04W 40/26; H04W 60/04; H04L 12/56; H04L 12/28
See application file for complete search history.

(56) References Cited

U.S. PATENT DOCUMENTS

| 5,412,654 | A | 5/1995 | Perkins | 370/94.1 |
| 6,304,556 | B1 | 10/2001 | Haas | 370/254 |
| 6,754,192 | B2 | 6/2004 | Kennedy | 370/331 |
| 6,763,013 | B2 | 7/2004 | Kennedy | 370/338 |
| 6,870,846 | B2 | 3/2005 | Cain | 370/392 |
| 7,027,426 | B2 | 4/2006 | Billhartz | 370/338 |
| 7,281,057 | B2 | 10/2007 | Cain | 709/238 |
| 7,382,765 | B2 | 6/2008 | Kennedy et al. | 370/351 |
| 7,742,399 | B2 | 6/2010 | Pun | 370/218 |
| 2002/0184351 | A1* | 12/2002 | Istvan et al. | 709/222 |
| 2003/0202465 | A1 | 10/2003 | Cain | |
| 2004/0203820 | A1 | 10/2004 | Billhartz | 455/452.1 |
| 2005/0053003 | A1 | 3/2005 | Cain et al. | 370/235 |

(Continued)

OTHER PUBLICATIONS

Ramasubramanian et al. "*SHARP: A Hybid Adaptive Routing Protocol for Mobile Ad Hoc Networks*" MobiHoc '03 Jun. 1-3, 2003.

(Continued)

*Primary Examiner* — Anez Ebrahim
(74) *Attorney, Agent, or Firm* — Allen, Dyer, Doppelt, Milbrath & Gilchrist, P.A.

(57) ABSTRACT

An ad hoc wireless communications network includes wireless nodes arranged in a backbone net and stub nets coupled to the backbone net via respective wireless nodes defining gateway nodes. A method for the network includes transmitting node role information from each gateway node to respective wireless nodes within each stub net. The node role information includes node reactive routing directions for establishing a route outside of a given stub net. A route request is unicast transmitted from a first wireless node in a respective first stub net to a respective first gateway node based upon the node role information. The route request is a request to communicate to a second wireless node in a respective second stub net. The route request is transmitted from the first gateway node across the backbone net to the second gateway node of the second stub net.

25 Claims, 7 Drawing Sheets

(56) References Cited

U.S. PATENT DOCUMENTS

| | | | |
|---|---|---|---|
| 2006/0056382 A1* | 3/2006 | Yamada et al. | 370/349 |
| 2006/0072542 A1* | 4/2006 | Sinnreich et al. | 370/351 |
| 2009/0323632 A1* | 12/2009 | Nix | 370/331 |
| 2010/0061301 A1 | 3/2010 | Antal et al. | 370/328 |
| 2011/0317589 A1* | 12/2011 | Jolma et al. | 370/255 |
| 2013/0273926 A1* | 10/2013 | Peng et al. | 455/450 |

OTHER PUBLICATIONS

Costa-Requena "*A Hybrid Routing Approach for Ad hoc Networks*" Helsinki University of Technology, Networking Laboratorye Teknillinen Korkeakoulu, Tieteverkkolaboratorio, Report Apr. 2007.

\* cited by examiner

AD HOC WIRELESS COMMUNICATIONS NETWORK WITH NODE ROLE INFORMATION ROUTING AND ASSOCIATED METHODS

FIELD OF THE INVENTION

The present invention relates to the field of communication networks, and more particularly, to routing within an ad hoc wireless communications network.

BACKGROUND OF THE INVENTION

Wireless networks have experienced increased development, with mobile ad hoc wireless communications networks being one of the rapidly developing areas. Physically, a mobile ad hoc network includes a number of geographically-distributed, potentially mobile nodes wirelessly connected by one or more radio frequency channels.

Compared with other type of networks, such as cellular networks or satellite networks, the most distinctive feature of mobile ad hoc networks is the lack of any fixed infrastructure. The network is formed of primarily mobile nodes, and a network is created on the fly as the nodes transmit to or receive from other nodes. The network does not in general depend on a particular node, and dynamically adjusts as some nodes join or others leave the network.

In a hostile environment where a fixed communication infrastructure is unreliable or unavailable, such as in a natural disaster area struck by earthquake or hurricane, an ad hoc network can be quickly deployed and provide much needed communications. As wireless communications increasingly permeates everyday life, new applications for mobile ad hoc networks will continue to emerge and become an important part of the communications structure.

Mobile ad hoc networks pose serious challenges to the designers. Due to the lack of a fixed infrastructure, nodes typically need to self-organize and reconfigure as they move, join or leave the network. All nodes could potentially be functionally identical and there may not be any natural hierarchy or central controller in the network.

Many network-controlling functions are distributed among the nodes. Nodes are often powered by batteries and have limited communication and computation capabilities. The bandwidth of the system is usually limited. The distance between two nodes often exceeds the radio transmission range, and a transmission has to be relayed by other nodes before reaching its destination. Consequently, a network has a multihop topology, and this topology changes as the nodes move around.

The Mobile Ad-Hoc Networks (MANET) working group of the Internet Engineering Task Force (IETF) has been actively evaluating and standardizing routing, including multicasting, protocols. The IETF MANET Working Group has been evaluating ad hoc routing protocol proposals for consideration for standards track. Each protocol can be classified as either proactive, reactive, or some hybrid of the two. Over the last few years the group has narrowed its focus on a small suite of simple but flexible proactive and reactive protocols that are capable of addressing multiple deployment scenarios.

A limiting issue with both proactive and reactive routing approaches surfaces when scaling a network. This is usually addressed by the use of a hybrid approach with some level of combining proactive and reactive protocols. The proactive protocol usually addresses local area routing while the reactive protocol is used to discover routes to remote destinations outside the limited scope of the proactive routing protocol.

The criteria for determining what is learned proactively verses reactively are in many cases specific to the deployment scenario. Proactive routing exchanges might be constrained by RF hops (hop radius) or possibly RF frequency (logical RF net), while reactive routing protocols cover those destinations falling outside the scope of the proactive protocol exchange.

As an example, FIG. 1 depicts a typical ad hoc wireless communications network 10 comprising wireless nodes arranged in a backbone net 20 interconnecting a plurality of stub nets 30, 40 and 50. The typical routing approach used in this type of network 10 is to exchange local routing knowledge within a stub net 30, 40 and 50 and exchange stub net address aggregates between wireless nodes 32, 42 and 52 defining gateway nodes in the backbone net 20.

Still referring to FIG. 1, a gateway node does not advertise routing to remote stub nets in its local stub net. Wireless nodes in the local stub net which need to get to remote destinations will default route that traffic to their gateway node. With this approach a packet routed from wireless node 38 to wireless node 58 would involve the use of a default route from wireless node 38 to gateway node 32, an aggregate route across the backbone net 20 between gateway nodes 32 and 52, and local routes between gateway node 52 and wireless node 58 in stub net 50.

However, this type of approach assumes that all wireless nodes maintain their membership in their assigned stub net or backbone net and are addressed appropriately for their net. This is a requirement so gateway nodes 32, 42 and 52 can advertise route aggregates to stub nets 30, 40 and 50 over the backbone net 20. This is a key scaling feature of this approach to keep backbone routing overhead manageable.

If for any reason a wireless node needs to move to a different stub net, then it typically needs to adopt that net's addressing scheme to maintain the efficiencies of route aggregation. The approach of changing a wireless node's address to fit a hosting net's address space introduces many new problems for network services, such as DNS, Routing and Security.

This impedes wireless node mobility, and therefore, the "ad hoc" nature of the network 10 because of the problems involved with a wireless node changing addresses dynamically to conform to a host net's addressing scheme. For example, if wireless node 56 in stub net 50 lost connectivity with other wireless nodes in stub net 50, but discovers it is in proximity of stub net 40, it should be able to join stub net 40. This type of scenario in an ad hoc tactical network is very real and should be addressed. In challenging or threatening theaters of operation it may be difficult to always maintain connectivity to your "home" network, thus requiring some automated means of net roaming without the complexities of changing wireless node addresses.

Flexibility is required in order to keep a user connected with their support groups. An ad hoc wireless communications network 10' that improves somewhat on the above approach will now be discussed in reference to FIG. 2. Prime notation is used to indicate similar elements in alternative embodiments with respect to FIG. 1. In this example, wireless node 48' is a member of stub net 50' and wireless node 58' is a member of stub net 30', and are not addressed the same as their neighboring wireless nodes in each of the stub nets 30', 40' and 50'.

In this approach, a hybrid routing mechanism is provided in which each stub net 30', 40' and 50' and backbone net 20' exchanges only its local routing information proactively. If any two wireless nodes within the same stub net need to communicate, routes proactively exist to support this communications, similar to the above example. However, if there is a need to communicate with a wireless node outside the local stub net, such is the case between wireless node 38' in stub net 30' and wireless node 48' in stub net 50', a reactive routing protocol can be used.

As shown in FIG. 2, as in most reactive routing protocols, a route request message identifying the target wireless node 48' is sent by wireless node 38' and flooded through stub net 30', through the gateway node 32', and on to the backbone net 20'. In this case gateway node 52' serving stub net 50' will have a local route to target wireless node 48' in stub net 50', and can send a route reply message back to wireless node 38' along the flooded discovery path building the route on the reverse path. In addition to this, gateway node 52' can also send a gratuitous route reply onto wireless node 48' to set up the reverse route from wireless node 48' back to wireless node 38' in the expectation that there will be a need for bi-directional communications between these wireless nodes.

This approach has an advantage over the approach in FIG. 1 since it does not require route aggregation, and therefore, does not rely upon a hard binding of a wireless node's address to their hosting stub net, making it more flexible in supporting wireless node mobility while keeping backbone routing overhead low. This approach is better served when a wireless node needs to migrate or roam to a new net.

A reliable assumption of any of these schemes is that traffic patterns in a hierarchical network tends to experience heavier local area traffic flows and lesser wide area traffic flows. Therefore, there is not always a need for every wireless node to proactively learn how to route packets to every other wireless node in a larger network. As well, it is assumed that each wireless node will have a preferred stub net that it is most likely to gravitate to when within range. This is also most likely where most of its communications will occur due to the group's common objectives.

The hybrid approach described in FIG. 2 relies on the flooding of discovery messages to establish routes to remote wireless nodes. With this mechanism there is some risk of network congestion if many users need access to remote services simultaneously causing a flurry of reactive route discoveries. A scenario that could cause this need for simultaneous discovery might be a sudden link change close to a commonly accessed server requiring all wireless nodes to re-establish connectivity. This sudden spike in flooding of discovery messages can negatively impact scalability and performance of the mobile ad hoc network, including a decrease in bandwidth due to an increase in network overhead.

SUMMARY OF THE INVENTION

In view of the foregoing background, it is therefore an object of the present invention to reduce the need for flooding reactive route messages to establish routes to remote wireless nodes outside the scope of the local proactive routing domain in an ad hoc wireless communications network to conserve bandwidth for user traffic.

This and other objects, features, and advantages in accordance with the present invention are provided by a communications method for an ad hoc wireless communications network using a hybrid routing scheme and comprising a plurality of wireless nodes interconnected through a subset of gateway nodes used as bridge remote destinations. For example, such a network may be arranged as a backbone net and a plurality of stub nets coupled to the backbone net via the subset of nodes acting as gateways. An alternative embodiment may employ clusters of nodes grouped around a cluster head node that uses a subset of gateway nodes at the edge of the cluster to join clusters together for the purpose of routing packets.

The method comprises proactively transmitting a node's role information between localized nodes and allowing some role information to be proxied by gateway nodes to the adjoining stubs or clusters. Proxying rules are specific to each identified role.

If a source node needs to communicate with a remote destination, a reactive route request is unicast transmitted from a first (source) wireless node in a respective first stub or cluster net to a respective first gateway node based upon the gateway node's advertised role information, with the route request being to a second (destination) wireless node in a respective second stub or cluster net. The route request is then transmitted from the first gateway node across the backbone net to the second gateway node of the second stub or cluster net.

The second gateway node transmits reactive route replies in response to the reactive route request received from the first gateway node, with one of the reactive route replies being to the second wireless node in the second stub net and one of the reactive route replies being to the first wireless node in the first stub net to establish an end-to-end route as if the second wireless node responded to the route request.

An advantage of the gateway nodes transmitting node role information to respective wireless nodes within each stub net is that there is a reduced flooding of reactive route requests messages in each stub net due to the proactive advertisements by gateway nodes of their reactive routing capabilities. This reduction in broadcast messaging greatly reduces the need for reactive discovery flooding by a wireless node, and therefore, allows for greater network scaling and better performance of the network by eliminating some of the broadcast overhead.

Another aspect of the invention is directed to an ad hoc wireless communications network comprising a plurality of wireless nodes arranged in a backbone net and a plurality of stub nets coupled to the backbone net via respective wireless nodes defining gateway nodes as defined above.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
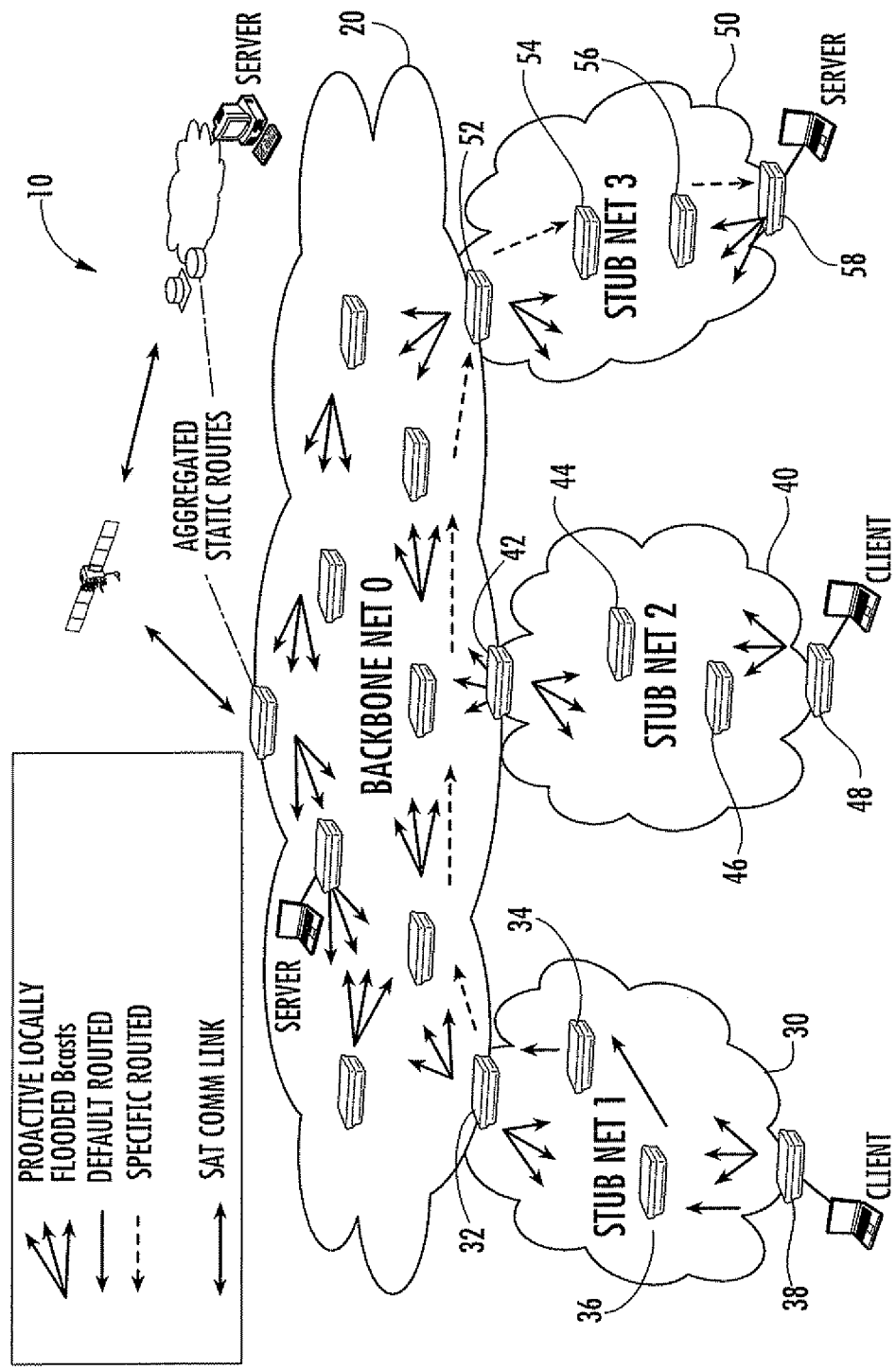
FIG. 1 is a schematic diagram of a mobile ad hoc wireless communications network using localized proactive routing and remote default routing in accordance with the prior art.
Figure 2:
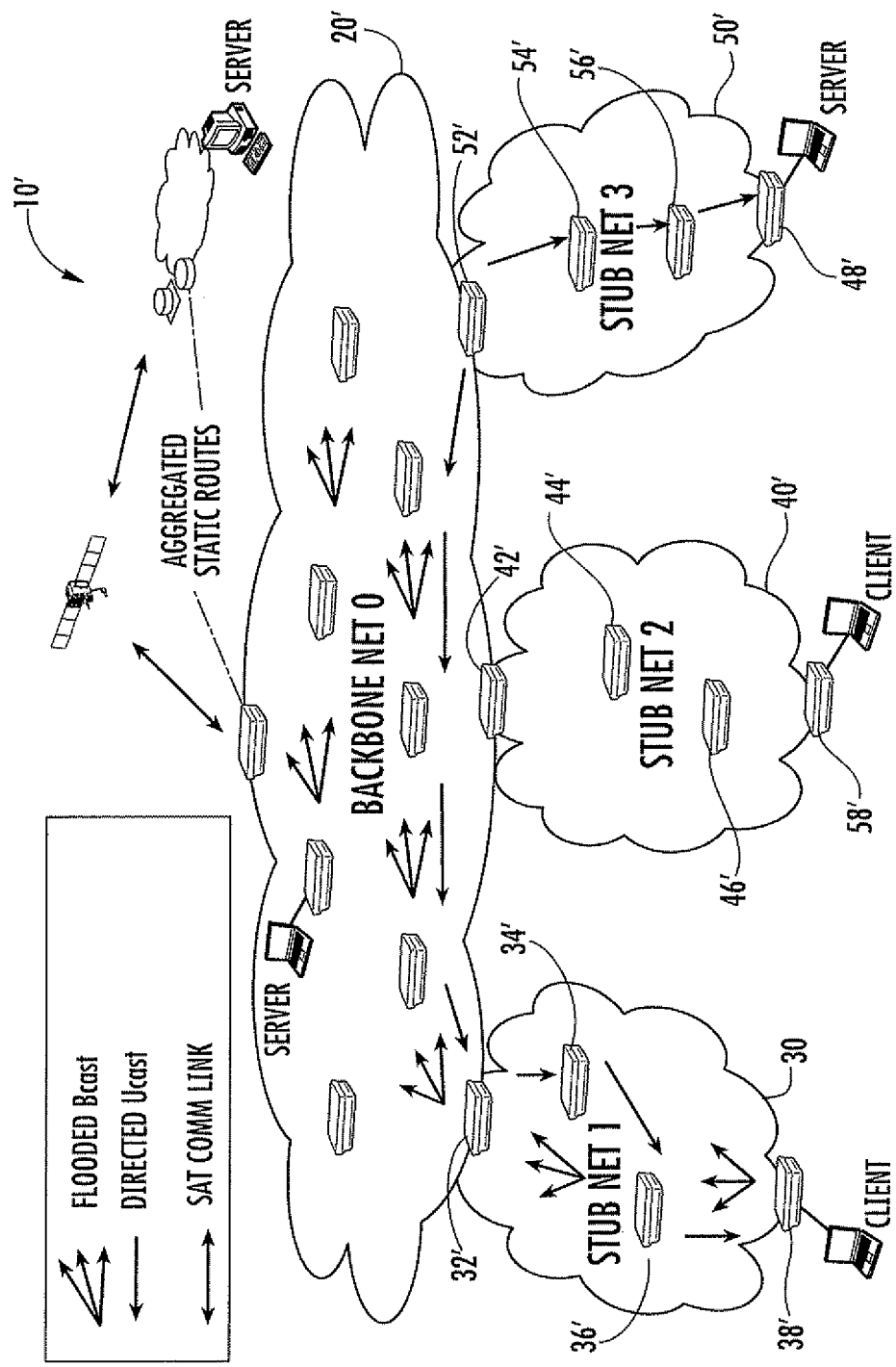
FIG. 2 is a schematic diagram of a mobile ad hoc wireless communications network using a hybrid approach that uses localized proactive routing coupled with remote reactive route discovery in accordance with the prior art.
Figure 3:
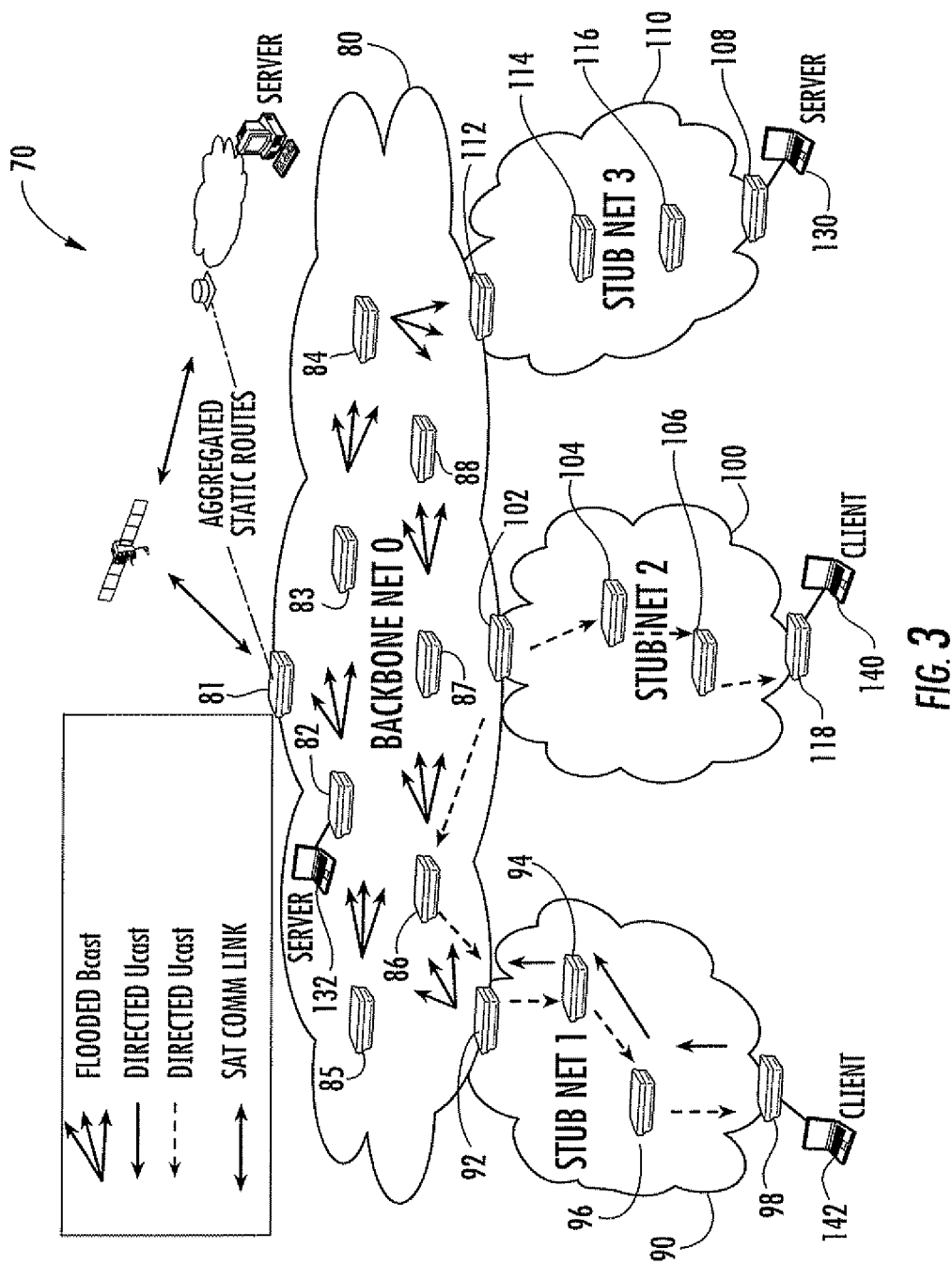
FIG. 3 is a schematic diagram of a mobile ad hoc wireless communications network using reactive gateway role identification in accordance with the present invention.

Referring now to FIG. 3, a schematic diagram of a mobile ad hoc wireless communications network 70 using reactive gateway role identification will be discussed. The mobile ad hoc wireless communications network 70 includes a backbone net 80 and stub nets 90, 100 and 110 coupled to the backbone net. Wireless nodes are arranged in the backbone net 80 and in the stub nets 90, 100 and 110.

The wireless nodes may be any suitable type of mobile device capable of communicating within a mobile ad hoc wireless communications network 70, such as computers, personal data assistants (PDAs), etc., including a wireless communications device, for example, and other devices which will be appreciated by those of skill in the art. Of course, it will also be appreciated that certain of the wireless nodes may optionally be connected to a fixed communication infrastructure in some applications, if desired.

The proactive advertisements by a gateway node of its reactive routing capabilities (i.e., gateway role identification) across the backbone net 80 to wireless nodes within its stub net advantageously reduces the flooding of reactive route request messages by the wireless nodes within the stub net when any one of the wireless nodes want to communicate across the backbone net. Instead of the wireless nodes within a stub net reactively broadcasting route request messages to determine a gateway node within their stub net, the wireless nodes now send a unicast route request transmission directly to their reactive gateway node 92, 102 or 112 as a result of the proactive advertisements by their gateway node. The gateway node will then use its reactive routing capabilities to find a path to the intended destination.

Wireless nodes 92, 102 and 112 define gateway nodes respectively coupling stub nets 90, 100 and 110 to the backbone net 80. Stub net 90 includes wireless nodes 92-98, stub net 100 includes wireless nodes 102-108, and stub net 110 includes wireless nodes 112-118. The backbone net 80 includes wireless nodes 81-88. Each illustrated wireless node has a radio address associated therewith. The gateway nodes defined by wireless nodes 92, 102 and 112 have two addresses associated therewith since they are 2-channel radios, one channel for their given stub net and one channel for the backbone net 80.

Wireless nodes that serve as gateway nodes 92, 102 and 112 identify themselves as such within their respective stub nets 90, 100 and 110 by advertising this capability within their localized proactive routing advertisements. A reactive gateway node 92, 102 and 112 is a wireless node that bridges two wireless nets and can propagate reactive route discoveries from one stub net to another.

These gateway nodes 92, 102 and 112 could also be classified as dual channel radios. Wireless nodes needing to discover routes to destinations outside of their local stub net no longer need to broadcast this discovery request locally. The wireless nodes just send it directly to their reactive gateway node 92, 102 or 112 as a unicast transmission. For a stub net having multiple gateway nodes, each gateway node will transmit its gateway role identification to the wireless nodes within their stub net and unicast transmission can be sent to both.

In the illustrated example, wireless node 118 from stub net 110 is in stub net 100, and wireless node 108 from stub net 100 is in stub net 110. Wireless node 98 (source) in stub net 90 needs to discover a route to wireless node 118 (destination). The address for wireless node 118 does not need to conform to any particular stub net addressing scheme. Since wireless node 118 is located in a different stub net, wireless node 98 does not have a pre-existing route to wireless node 118.

This triggers wireless node 98 to initiate a reactive ad hoc route discovery. Given that gateway node 92 is proactively advertising its reactive ad hoc routing capability within stub net 90, wireless node 98 can direct its reactive route request message directly to gateway node 92 (i.e., unicast), thereby removing the standard mechanism of flooding the route request within the stub net.

This flow is depicted by the solid arrow lines in stub net 90. Upon receipt of the route request from the source (wireless node 98) and after verifying it did not have previous knowledge of the target destination (wireless node 118), gateway node 92 then proceeds to flood this route request message across the backbone net 80 for all wireless nodes 81-88 therein. This flow is depicted by the three solid arrow grouped lines in the backbone net 80. This broadcast is required because stub net routing is not proactively advertised across the backbone net 80 since route aggregation was traded for net roaming to better keep the wireless nodes seamlessly connected.

In this example, gateway node 102 will receive the route request message and determine that it can access the destination based upon its proactive routing mechanism. The dashed arrows shown from gateway node 102 to wireless node 98 (source) via wireless nodes 86, 92, 94 and 96 represent one reactive route reply. Another reactive route reply is from gateway node 102 to wireless node 118 (destination) via wireless nodes 104 and 106. These two reactive route replies from gateway node 102 establish IP routes between the source (wireless node 98) and the destination (wireless node 118). The link between gateway node 102 and wireless node 118 represent a "gratuitous" route reply on behalf of gateway node 102 to establish the end-to-end route as if wireless node 118 responded to the route request.

An advantage of proactive advertisements by a gateway node of its reactive routing capabilities (i.e., gateway role identification) to wireless nodes within its stub net advantageously reduces the flooding of reactive route request messages from the same wireless nodes. Also, when a stub net 90, 100 and 110 is isolated from the rest of the network 70 due to lack of a gateway node, unproductive discovery messages need not be generated, allowing the local wireless node to issue ICMP destination unreachable message back to the source for un-routable packets.

Figure 4:
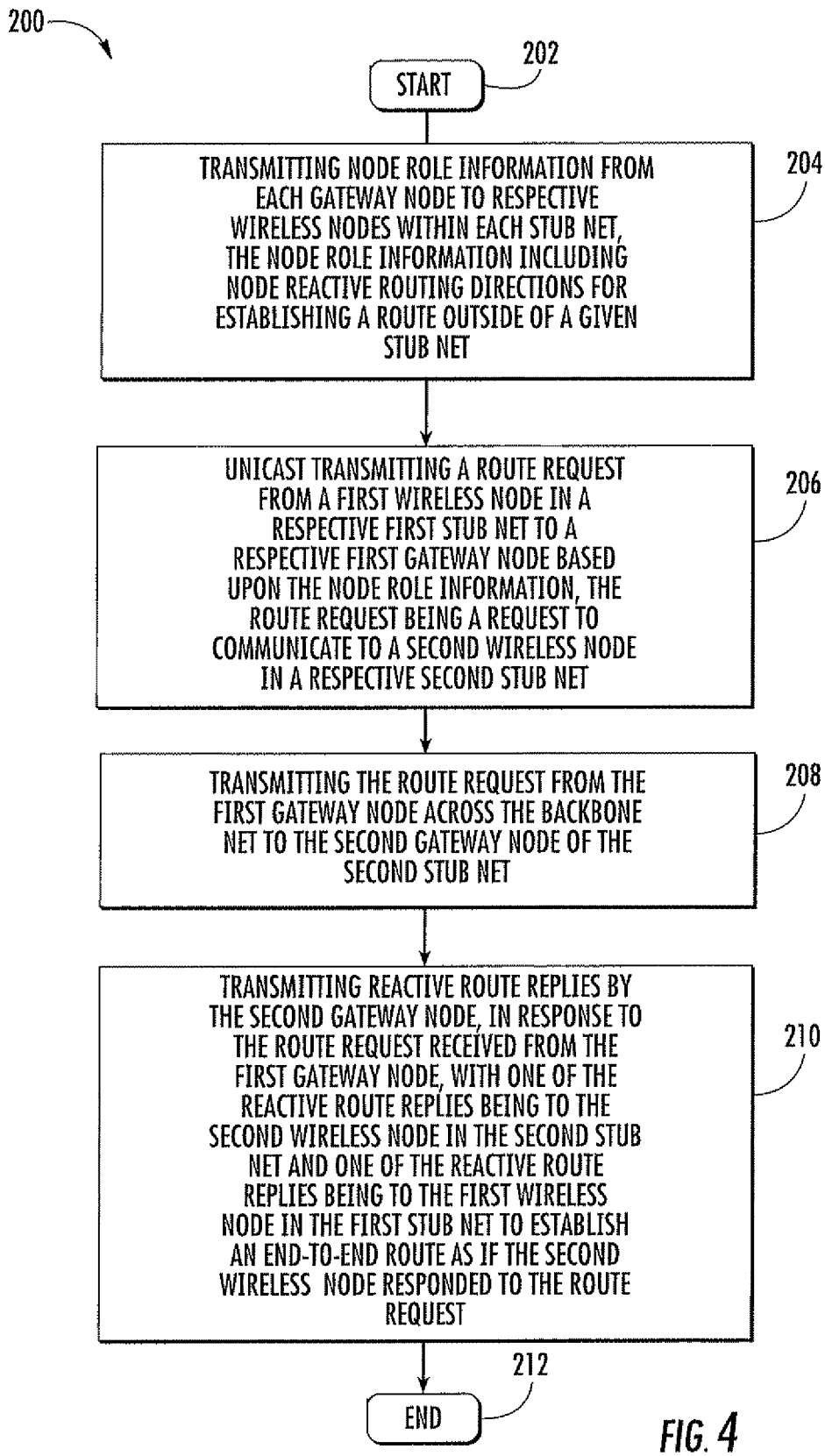
FIG. 4 is a flowchart illustrating a communications method for an ad hoc wireless communications network in accordance with the present invention.

A flowchart 200 illustrating the above described communications method for an ad hoc wireless communications network 70 will now be described with reference to FIG. 4. From the Start (Block 202), the method comprises at Block 204 transmitting node role information from each gateway node to respective wireless nodes within each stub net 90, 100 and 110, with the node role information including node reactive routing directions for establishing a route outside of a given stub net. At Block 206, a route request is unicast transmitted from a first wireless node 98 in a respective first stub net 90 to a respective first gateway node 92 based upon the node role information of the gateway, with the route request being to a second wireless node 118 in a respective second stub net 100. The first wireless node 98 is a source, and the second wireless node 118 is a destination.

The route request is transmitted from the first gateway node 92 across the backbone net 80 to the second gateway node 102 of the second stub net 100 at Block 208. At Block 210, the second gateway node 102 transmits reactive route replies in response to the route request received from the first gateway node 92. One of the reactive route replies is to the second wireless node 118 in the second stub net 100, and one of the reactive route replies is to the first wireless node 98 in the first stub net 90 to establish an end-to-end route as if the second wireless node 118 responded to the route request. The method ends at Block 212.

Figure 5:
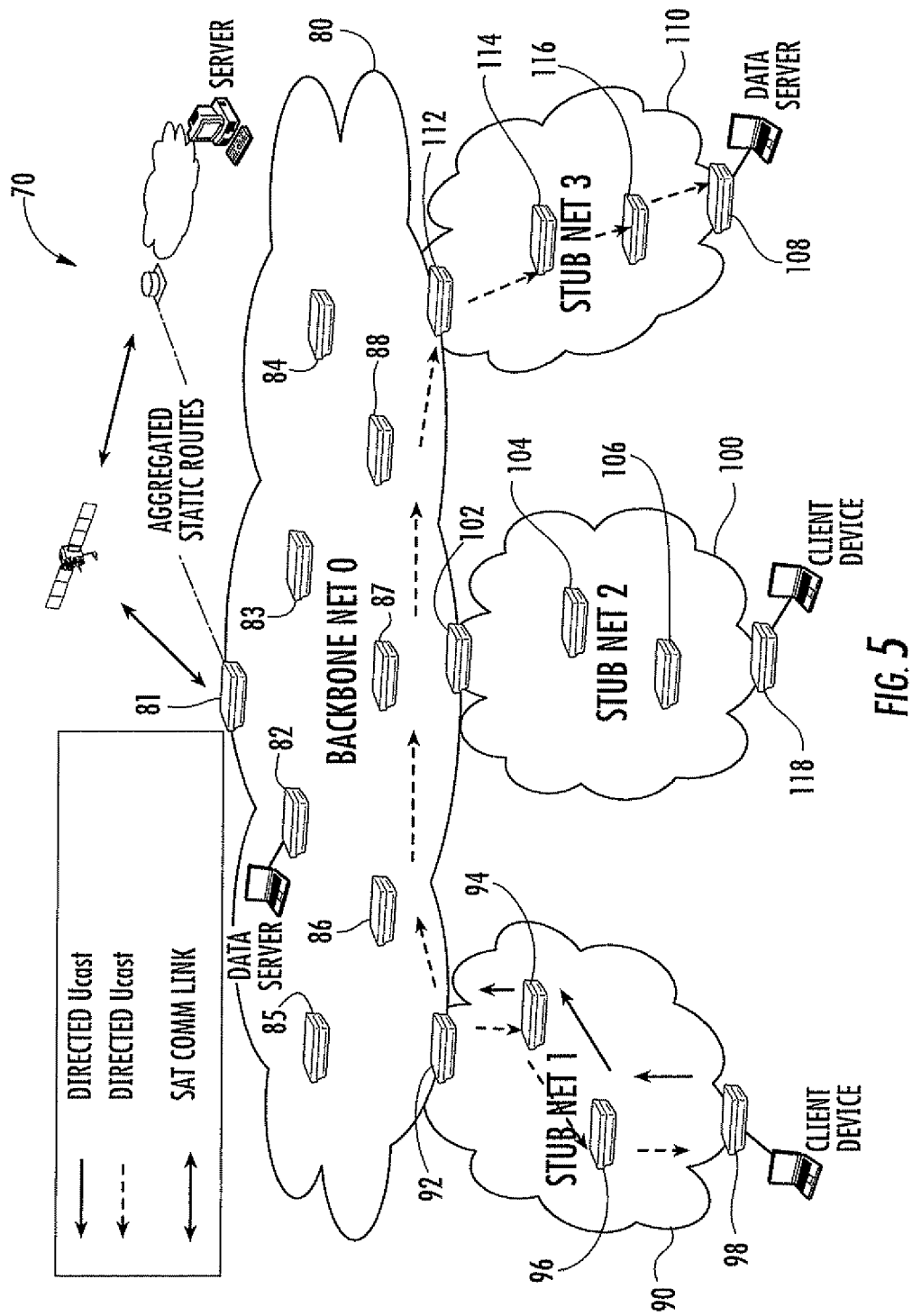
FIG. 5 is a schematic diagram of a mobile ad hoc wireless communications network using the same hybrid approach as in FIG. 3 but with server gateway role identification in accordance with the present invention.

Referring now to FIG. 5, select wireless nodes may also identify their role as a server gateway. A server gateway is a wireless node connected to a data server. Improvements in the network 70 are achieved by reducing reactive discovery route request broadcast messaging over the backbone net 80 for routes to commonly accessed destinations, such as a data server. For example, bi-directional communications is often required between client devices 140, 142 and data servers 130, 132. The data servers 130, 132 are commonly accessed destinations.

As a wireless node becomes aware that it fronts a frequently accessed data server either through configuration or some discovery mechanism, an additional role may be proactively advertised similar to that for the reactive ad hoc gateway capability discussed above. In this case, the wireless node advertising that it fronts a data server will either advertise its black IP address in a secure network or the server's address in an unsecured network.

For this example it will be assumed that the illustrated network 70 is secure. In FIG. 5, a wireless node 108 advertises its role of fronting a data server 130 and includes its own address in the advertisement. When the gateway node 112 in the same stub net 110 receives this advertisement, the gateway node 112 will then include it in its proactive advertisements out onto the backbone net 80. This advertisement from the gateway node 112 will allow the other gateway nodes 92 and 102 to learn that wireless node 108 is a server node, and that it is accessible through gateway node 112.

Server routing information should not propagate from the backbone net 80 into the stub nets 90, 100, 110 since bi-directional paths are required from each client device and the route established thus far does not represent a bi-directional path. However, this can now allow for a more efficient reactive discovery to set up the independent bi-directional paths required between client devices 140, 142 and data servers 130, 132.

In the illustrated example, it is now assumed that gateway node 92 has obtained knowledge that gateway node 112 is fronting in its stub net 110 a data server 130 that has now been identified as wireless node 108. Therefore, when wireless node 98 needs to access the data server 130 fronted by wireless node 108, wireless node 98 will initiate a reactive route discovery for server node 108 as depicted by the solid arrow lines in stub net 90.

Using the reactive ad hoc gateway role advertisement as described with reference to FIGS. 3 and 4, wireless node 98 would only need to unicast transmit a reactive route request to gateway node 92 since this node has already advertised itself as having a reactive ad hoc gateway role. Upon receipt of this route request, gateway node 92 will determine that it already had routing information to the server node 108, and will then respond with a route reply back to wireless node 98 to set up that segment of the bi-directional path. Gateway node 92 would also initiate sending a gratuitous route reply to the server node 108 to establish the second segment of the bi-directional path between wireless node 98 and sever node 108.

The benefit of advertising data server information is realized in the reduced need to broadcast reactive route requests across the backbone net 80. Since data server access most likely accounts for a high percentage of traffic on the network 70, there can be a significant bandwidth savings. This is even after taking into account that some additional information in the form of a bit map or bit vector along with certain node addresses are shared as part of the localized proactive routing protocol.

A bit vector consisting of an 8-bit field, for example, is added to the proactive advertisements of a node. An 8-bit vector may be advertised via OLSR HNA messages that indicate a wireless node's ad hoc routing role such as a default gateway node (DefaultGwy), an ad hoc gateway node (AdHocGwy), a server node (ServerGwy), and a sink node (SinkGwy) and others to be defined. A list of 32-bit addresses appended to an OLSR HNA message identifies a designated remote wireless node that fronts a data server/sink. The list of addresses may also include by proxy in any gateway node's HNA advertisements with the corresponding capability/role bit set. This allows select routing information from one RF network to proactively propagate into a remote network connected by an ad hoc gateway node.

An advantage of this implementation is that it does not incur the cost of additional transmission since this data is distributed via normal proactive OLSR messaging. The cost incurred will be from an increased size in HNA messages distributed by ad hoc gateway nodes that is directly dependent upon the number of servers/sinks deployed in the network 70 that need to be accessed by ad hoc network users.

A first bit in the bit vector may advertise that the wireless node itself is a gateway node, and a second bit in the bit vector may advertise that the wireless node is fronting for a data server. As noted above, the bit vector allows identifying roles of certain wireless nodes to be identified, and this information is then included in the routing tables that are apart of each wireless gateway node or can effect how non-gateway nodes direct reactive route requests for remote destination nodes.

The size of the bit vector is very minimal, and can be piggybacked on proactive routing messages. The impact on the network 70 of transmitting the bit vector is still significantly less as compared to more channel access attempts and the flooding of packets to determine the same information as essentially provided by the bit vector.

Figure 6:
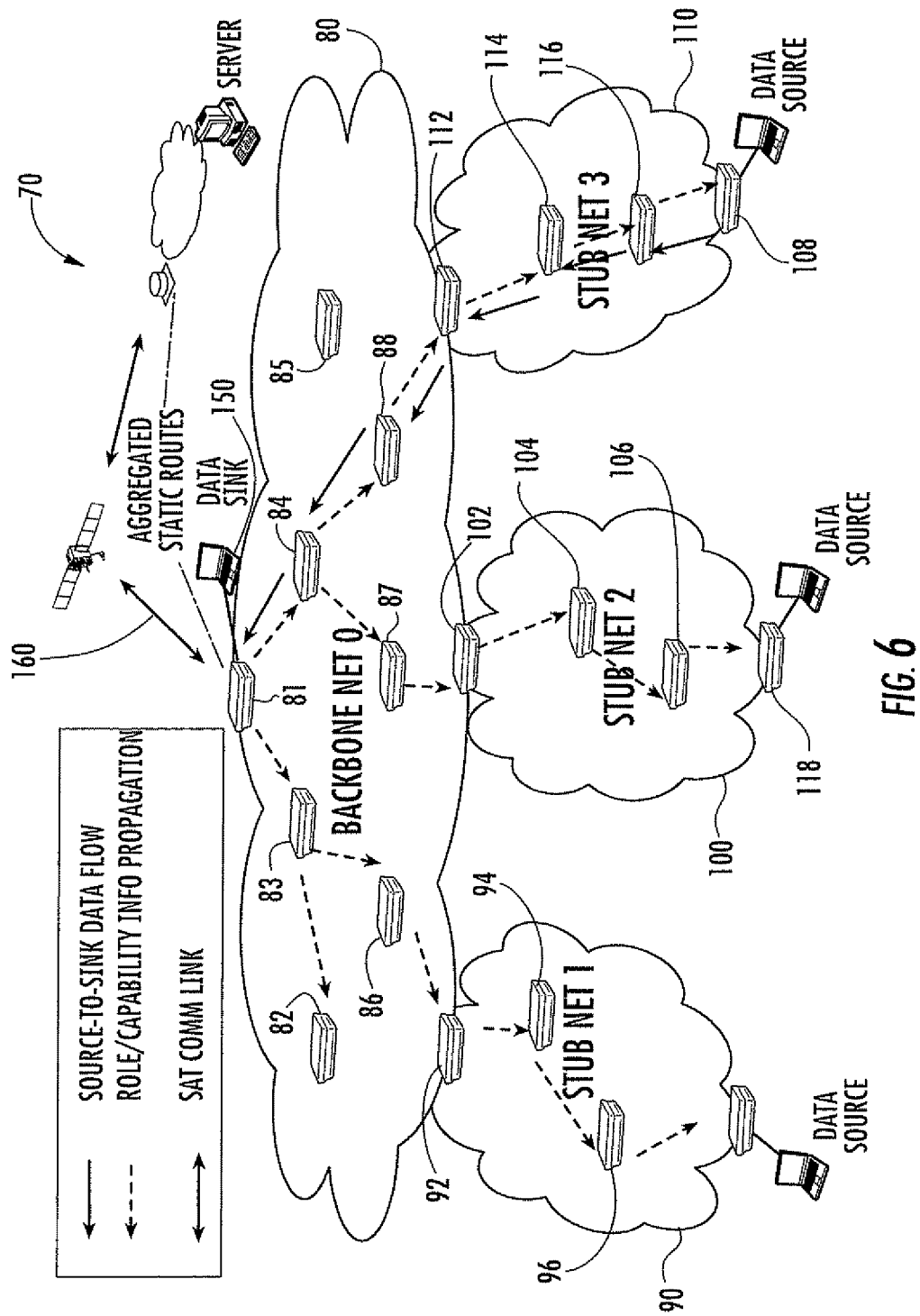
FIG. 6 is a schematic diagram of a mobile ad hoc wireless communications network using the same hybrid approach as in FIG. 3 but with data sink role identification in accordance with the present invention.

Referring now to FIG. 6, another aspect is directed to select wireless nodes identifying their role as a data sink, i.e., a data sink is a wireless node connected to a data sink device 150 that serves as a repository for information from single or multiple sources. From a routing perspective, the key here is that the path between the source wireless node and the destination sink wireless node (data device 150) need only be unidirectional toward the sink.

One example is the relationship between a managed node and an SNMP trap/event server. The managed node need only know the address of its SNMP trap/event server, and then all traps/events flow across the network from the managed node to the trap/event server.

This type of routing is addressed through a mechanism very similar to the client/server model described in the above example. However, in this case, the routing of information that a wireless node 81 is coupled to a data sink device 150 is to propagate throughout the entire network 70, including the backbone net 80 and into each of the stub nets 90, 100, 110. An exception is for the source stub net if it originates from one.

As illustrated in FIG. 6, a wireless node 81 in the backbone net 80 fronts a data sink device 150. As a result, this wireless node 81 advertises itself as having a data sink routing role within its proactive ad hoc routing advertisements. This advertisement is propagated throughout the backbone net 70 and reaches all the gateway nodes 90, 100 and 110. Each of the gateway nodes 90, 100 and 110 in turn allow this role information about the data sink node 81 to propagate into each of the stub nets within their respective proactive ad hoc routing advertisements. Each of the advertisements within the stub nets 90, 100 and 110 identifies the respective gateway node as fronting the data sink node 81.

The propagation of this role information allows all wireless nodes in the overall network 70 to maintain a unidirectional route from each source node to the data sink node 81 through anyone of the intermediate gateway nodes 90, 100 and 110. This allows the proactive establishment of an end-to-end routing to any identified data sink in the network 70 without the need for a reactive route discovery component.

The additional information needed to define the end-to-end routing to any identified data sink node 81 is provided in the form of a bit map or bit vector that is shared proactively. A bit vector consisting of an 8 bit field, and possibly a list of IP addresses for example, is added to the proactive advertisements of the wireless nodes.

As discussed above, a first bit in the bit vector advertises that the wireless node itself may be a gateway node, and a second bit in the bit vector advertises that the wireless node may be fronting for a data server. A third bit may then be used to identify that a wireless node is a data sink node. The bit vector thus allows identifying roles of certain wireless nodes to be identified, and this information is then included in the routing tables that are apart of each wireless node or can effect how non-gateway nodes direct reactive route requests for remote destination nodes.

The size of the bit vector is very minimal, and can be piggybacked on proactive routing messages. The impact on the network 70 of transmitting the bit vector is still significantly less as compared to more channel access attempts and the flooding of packets to determine the same information as essentially provided by the bit vector.

These above mechanisms can also be used to manage routing to data servers and data sinks that reside on external networks accessible through other links, such as the SATCOM link 160 shown in FIG. 6, for example. To accomplish this type of activity the backbone gateway wireless node 81 is either configured with static routes to external networks, or runs the appropriate routing protocol of the external network to dynamically learn about external network destinations. The backbone gateway wireless node 81 would need to advertise an aggregate route identifying the subnets/net reachable from the backbone gateway wireless node.

As an alternative approach, the external network router connected to the backbone gateway wireless node 81 is configured with a static route identifying the ad hoc network address space. This advantageously allows the backbone gateway wireless node 81 to be configured to support any role/capability it needs as well as allow it to respond to reactive route requests for external network destinations.

Figure 7:
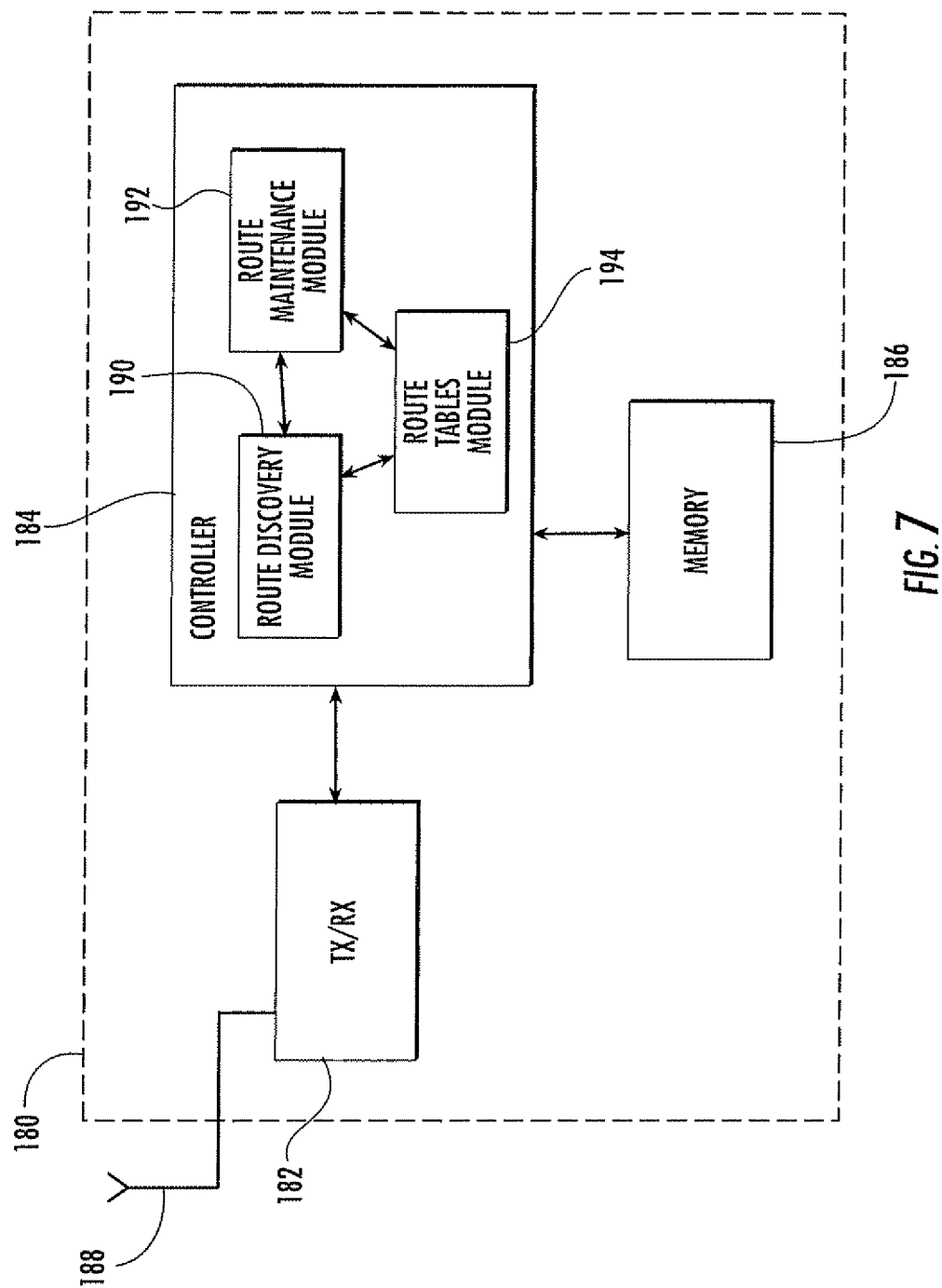
FIG. 7 is a schematic diagram illustrating a router within a wireless node in accordance with the present invention.

Another aspect of the invention is directed to an ad hoc wireless communications network 70 as described above. More particularly, each wireless node includes a router 180 that has a communications device 182 and an antenna 188 connected thereto to wirelessly communicate with other wireless nodes, as illustrated in FIG. 7. The router 180 includes a controller 184 to route communications via the communications devices 182. A memory 186 may be included as part of the controller 184 or in connection with the controller.

The controller 184 includes a route tables module 194 to define routes in the network 70. A route is a set of communication nodes from a source to a destination. The controller 184 also includes a route discovery module 190 to discover routes and update the route tables in the route tables module 194. The controller 184 also includes a route maintenance module 192 that is responsible for maintaining paths between active source-destination node pairs and for removing invalid routes from the route tables module 194.

Even though a specific network topology comprising a backbone net and stub nets was discussed above, the present invention is applicable to other network topologies, as readily appreciated by those skilled in the art. For example, an RF net may be segmented in clusters all linked together through cluster heads or nodes serving as inter-cluster gateways. The clusters of nodes may be grouped around a cluster head node that uses a subset of gateway nodes at the edge of the cluster to join clusters together for the purpose of routing packets. In other words, the present invention is applicable to any network scaling technique that divides a wireless network into interconnected clusters or groups and uses a hybrid adhoc routing scheme which employs a combination of proactive and reactive techniques.

Moreover, role information as discussed above with respect to a gateway node is applicable to other types of nodes. Role information from selective nodes is proactively transmitted and forwarded throughout the network, with the role information being leveraged to reduce overhead communication traffic in establishing and maintaining routes in the network.

Role information thus influences how routing information can be efficiently distributed to better support network scaling. To keep the overhead of reactive discoveries down low, the role routing technique as discussed above is used so that location of frequently used nodes and the like are proactively propagated throughout the network. This in turn reduces the need for reactive discovery for these frequently used nodes and the like.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications method for an ad hoc wireless communications network, the method comprising:
   transmitting within the ad hoc wireless communications network comprising a plurality of wireless nodes arranged in a backbone net and a plurality of stub nets coupled to the backbone net via respective wireless nodes defining gateway nodes, and with each stub net further comprising a plurality of wireless nodes, node role information from each gateway node to respective wireless nodes within each stub net, with the node role information being relayed between the plurality of wireless nodes within each stub net, and with the node role information including node reactive routing directions for establishing a route outside of a given stub net, with the node role information being proactively transmitted from each gateway node to the respective wireless nodes within each stub net;

unicast transmitting within the ad hoc wireless communications network a route request from a first wireless node in a respective first stub net to a respective first gateway node based upon the node role information, the route request being a request to communicate to a second wireless node in a respective second stub net; and transmitting within the ad hoc wireless communications network the route request from the first gateway node across the backbone net to the second gateway node of the second stub net.

2. The communications method according to claim 1 wherein the second gateway node transmits reactive route replies in response to the route request received from the first gateway node, with one of the reactive route replies being to the second wireless node in the second stub net and another of the reactive route replies being to the first wireless node in the first stub net to establish an end-to-end route as if the second wireless node responded to the route request.

3. The communications method according to claim 1 wherein reactive routing is used to transmit the route request across the backbone net.

4. The communications method according to claim 1 wherein at least one of a given stub net further comprises a data server coupled to a respective given wireless node defining a given server node; and further comprising transmitting within the at least one given stub net data server information related to the data server from the given data server node to a respective given gateway node.

5. The communications method according to claim 4 wherein the data server information is configured as a bit vector, and also includes an address of the given data server node.

6. The communications method according to claim 4 further comprising transmitting the data server information across the backbone net from the given gateway node to another gateway node.

7. The communications method according to claim 6 wherein the data server information is configured as a bit vector, and also includes an address of the given gateway node and an address of the given data server node.

8. The communications method according to claim 1 wherein at least one of a given stub net further comprises a data sink coupled to a respective given wireless node defining a given data sink node; and further comprising transmitting within the at least one given stub net data sink information related to the data sink from the given data sink node to a respective given gateway node.

9. The communications method according to claim 8 wherein the data sink information is configured as a bit vector, and also includes an address of the given data sink node.

10. The communications method according to claim 8 further comprising transmitting the data sink information across the backbone net from the given gateway node to another gateway node, and transmitting the data sink information within each stub net by each given gateway node.

11. The communications method according to claim 8 wherein an end-to-end route from a given wireless node to the given data sink node is unidirectional.

12. A communications method for an ad hoc wireless communications network, the method comprising:

proactively transmitting within the ad hoc wireless communications network comprising a plurality of wireless nodes arranged in a backbone net and a plurality of stub nets coupled to the backbone net via respective wireless nodes defining gateway nodes, and with each stub net further comprising a plurality of wireless nodes, node role information from each gateway node to respective wireless nodes within each stub net, with the node role information being relayed between the plurality of wireless nodes within each stub net, and with the node role information including node reactive routing directions for establishing a route outside of a given stub net;

unicast transmitting within the ad hoc wireless communications network a route request from a first wireless node in a respective first stub net to a respective first gateway node based upon the node role information, the route request being a request to communicate to a second wireless node in a respective second stub net;

reactively transmitting within the ad hoc wireless communications network the route request from the first gateway node across the backbone net to the second gateway node of the second stub net; and transmitting within the ad hoc wireless communications network reactive route replies from the second gateway node in response to the route request received from the first gateway node, with one of the reactive route replies being to the second wireless node in the second stub net and one of the reactive route replies being to the first wireless node in the first stub net to establish an end-to-end route as if the second wireless node responded to the route request.

13. The communications method according to claim 12 wherein at least one of a given stub net further comprises a data server coupled to a respective given wireless node defining a given server node; and further comprising transmitting within the at least one given stub net data server information related to the data server from the given data server node to a respective given gateway node.

14. The communications method according to claim 13 further comprising transmitting the data server information across the backbone net from the given gateway node to another gateway node.

15. The communications method according to claim 12 wherein at least one of a given stub net further comprises a data sink coupled to a respective given wireless node defining a given data sink node; and further comprising transmitting within the at least one given stub net data sink information related to the data sink from the given data sink node to a respective given gateway node.

16. The communications method according to claim 15 further comprising transmitting the data sink information across the backbone net from the given gateway node to another gateway node, and transmitting the data sink information within each stub net by each given gateway node.

17. An ad hoc wireless communications network comprising:

a plurality of wireless nodes arranged in a backbone net and a plurality of stub nets coupled to the backbone net via respective wireless nodes defining gateway nodes, and with each stub net further comprising a plurality of wireless nodes;

each gateway node configured to proactively communicate node role information to respective wireless nodes within each stub net, with the node role information being relayed between the plurality of wireless nodes within each stub net, and with the node role information including node reactive routing directions for establishing a route outside of a given stub net;

a first wireless node configured to unicast transmit a route request in a respective first stub net to a respective first gateway node based upon the node role information, the route request being a request to communicate to a second wireless node in a respective second stub net; and
said first gateway node transmitting the route request across said backbone net to said second gateway node of said second stub net.

18. The ad hoc wireless communications network according to claim 17 wherein said second gateway node is configured to transmit reactive route replies in response to the route request received from said first gateway node, with one of the reactive route replies being to said second wireless node in said second stub net and one of the reactive route replies being to said first wireless node in said first stub net to establish an end-to-end route as if said second wireless node responded to the route request.

19. The ad hoc wireless communications network according to claim 17 wherein at least one of a given stub net further comprises a given data server coupled to a respective given wireless node defining a server node; and wherein said at least one of a given stub is configured to transmit within said at least one given stub net data server information related to said data server from said given data server node to a respective given gateway node.

20. The ad hoc wireless communications network according to claim 19 wherein the data server information is configured as a bit vector, and also includes an address of the given data server node.

21. The ad hoc wireless communications network according to claim 19 wherein said given gateway node is configured to transmit the data server information across the backbone net to another gateway node.

22. The ad hoc wireless communications network according to claim 21 wherein the data server information is configured as a bit vector, and also includes an address of the given gateway node and an address of the given data server node.

23. The ad hoc wireless communications network according to claim 17 wherein at least one of a given stub net further comprises a given data sink coupled to a respective given wireless node defining a data sink node; and wherein said at least one given data sink node is configured to transmit within said at least one given stub net data sink information related to said data sink from to a respective given gateway node.

24. The ad hoc wireless communications network according to claim 23 wherein the data sink information is configured as a bit vector, and also includes an address of the given data sink node.

25. The ad hoc wireless communications network according to claim 23 wherein said given gateway node is configured to transmit the data sink information across said backbone net to another gateway node, and to transmit the data sink information within each stub net.

* * * * *